Aug. 19, 1958  W. G. HAWKINS  2,847,706
MACHINE FOR FORMING THERMOPLASTIC IMPREGNATED FIBROUS BLANKS
Filed March 18, 1955  7 Sheets-Sheet 1

Fig. 1.

INVENTOR
W. G. HAWKINS
BY
Wenderoth, Lind & Ponack
ATTORNEYS

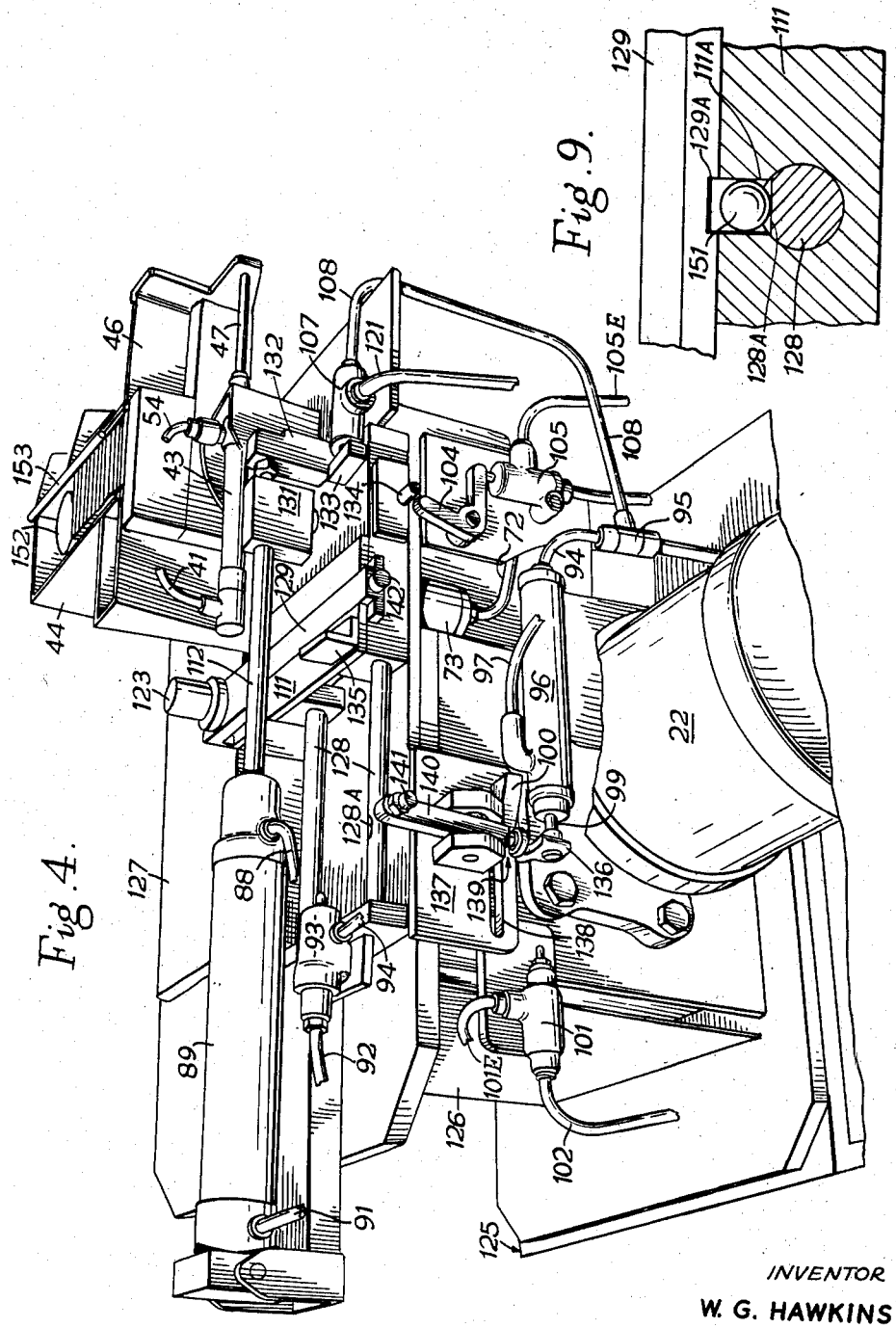

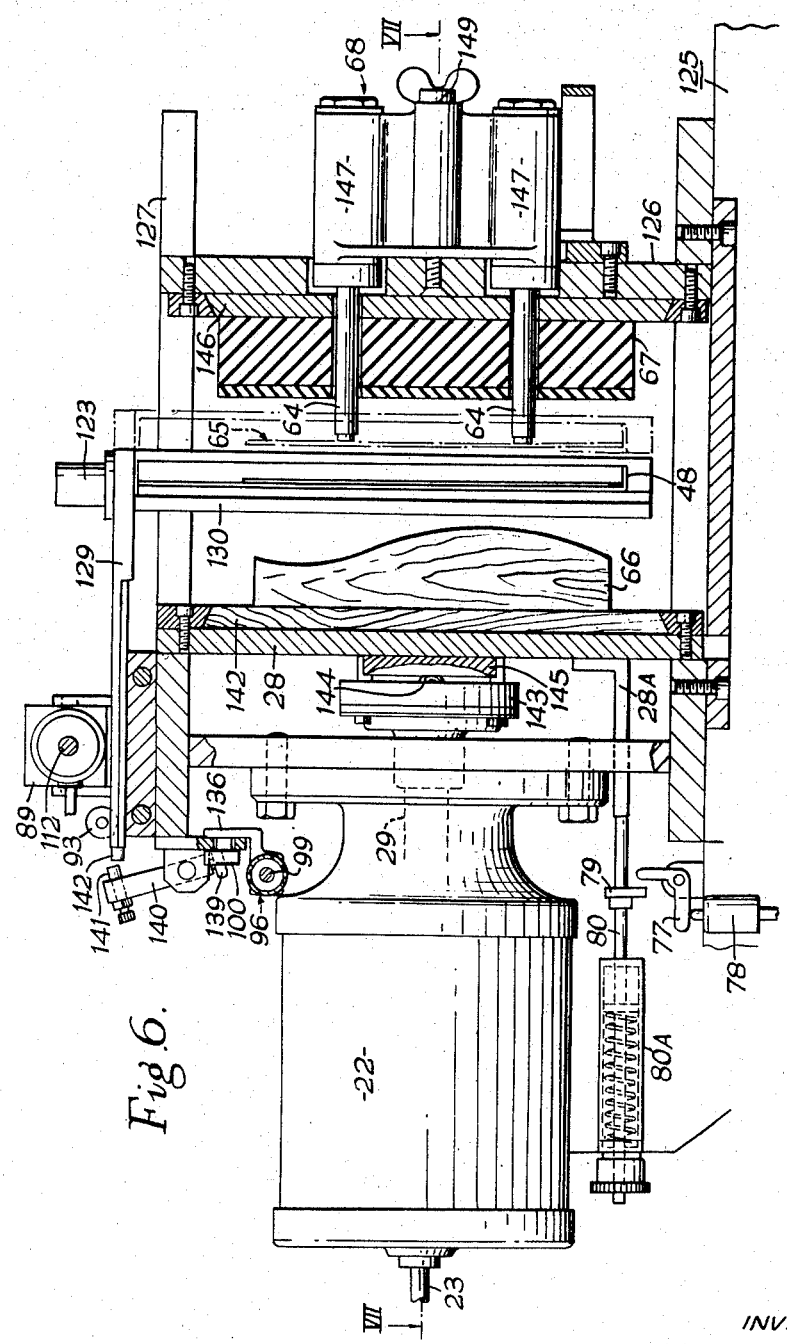

INVENTOR
W. G. HAWKINS

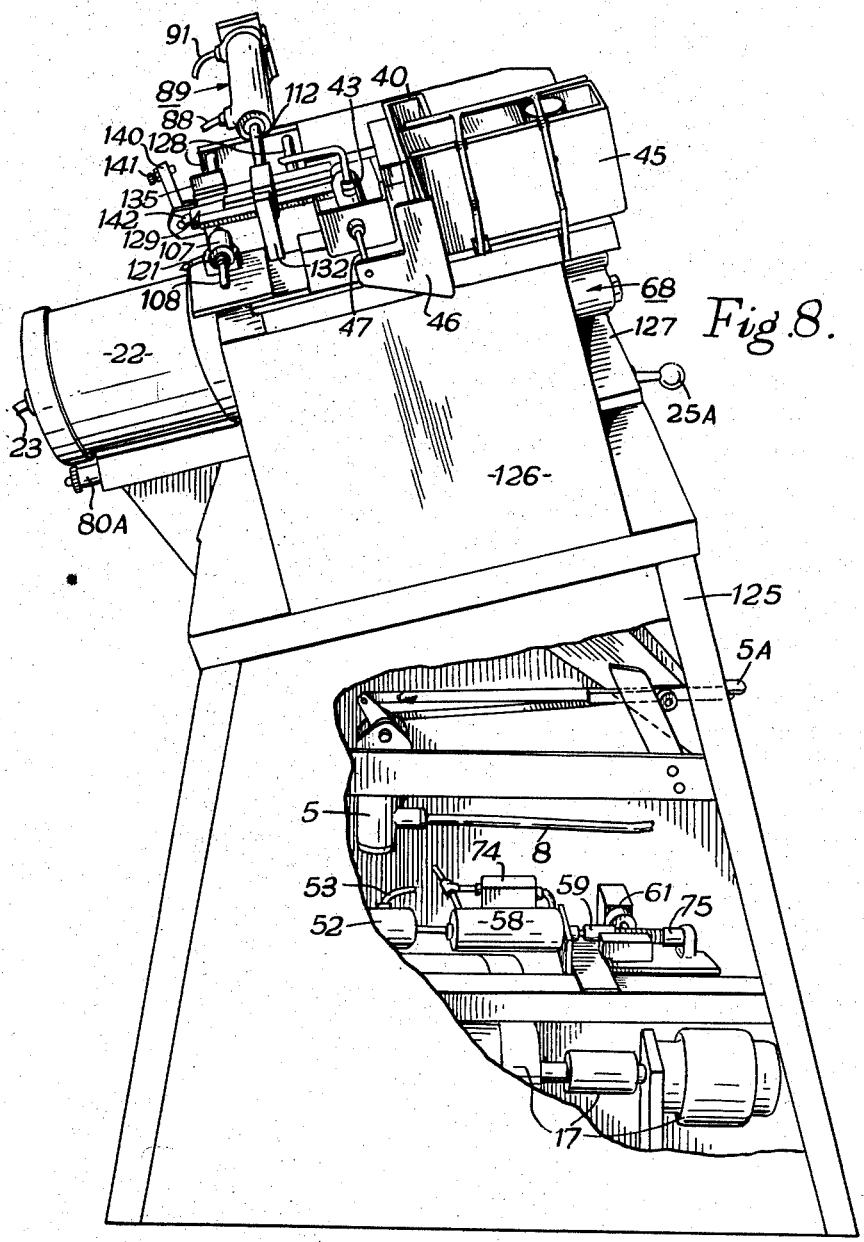

United States Patent Office 2,847,706
Patented Aug. 19, 1958

2,847,706

MACHINE FOR FORMING THERMOPLASTIC IMPREGNATED FIBROUS BLANKS

Wallace Gerald Hawkins, Ashcott, near Bridgwater, England, assignor to C. & J. Clark Limited, Street, Somerset, England Application March 18, 1955, Serial No. 495,320

2 Claims. (Cl. 18—19)

This invention relates to the manufacture of single-ply and multi-ply components from fibrous and other materials, such as the cap stiffeners, shank-backers and similar articles used in the manufacture of footwear, hereinafter referred to as shoes. Many components used in trade and industry, such as shoe shank-backers for example, are composed of blanks of leatherboard impregnated with synthetic resin or similar or equivalent board or sheet material, and such components may require to be moulded to shape.

Shank-backers and other shoe components moulded from leatherboard or other board or sheet material fit very accurately to the contours of a manufacturing last and retain the shape into which they have been moulded if the board or sheet material is conditioned immediately prior to the moulding operation.

It is an object of this invention to provide an improved machine for manufacturing a thermoplastic impregnated board or sheet component.

Another object of the invention is to provide an improved machine for manufacturing a board or sheet component which provides means for performing the steps of subjecting the blank for a short time to conditions of high temperature and for passing the conditioned blank directly to a moulding operation. If desired the high temperature treatment may be accompanied by high humidity.

It will be understood that the expression "high temperature" is a relative one and is intended to cover a temperature range (which may be modified by the degree of humidity prevailing during treatment) adapted to produce a softening of the blank without adversely affecting its moulding properties. For instance, a temperature of about 400° C., is suitable for some resin-impregnated leatherboards. The desirable temperature will generally be ascertainable readily by tests.

A further object of the invention is to provide an improved machine as above described by which said conditioning can be effected with such rapidity that the process of conditioning can be carried out concurrently with and at the same rate at which a component can be moulded, so that while one component is being moulded another component is being concurrently conditioned in readiness for the next moulding operation.

In order that the invention may be more readily understood, the main features of an automatic machine for conditioning and moulding shank backers for shoes will now be described.

In this machine the various actions of the moving parts of the machine are preferably controlled automatically by mechanical, pneumatic or electrical means, under control of an electro-pneumatic circuit.

In the accompanying drawings:

Figure 1 is a pictorial diagram showing, in particular, the pneumatic and hydraulic circuits of the machine;

Figure 4 is a rear perspective view of the upper part of the machine, looking in the direction of arrows IV, Figures 2 and 3;

Figure 6 is a part-sectional side view looking in the direction of arrow VI, Figure 3;

Figure 8 is a side perspective view looking in the direction of arrow VIII in Figures 2 and 3, and Figure 9 illustrates a detail of construction hereinafter referred to.

Figure 2:
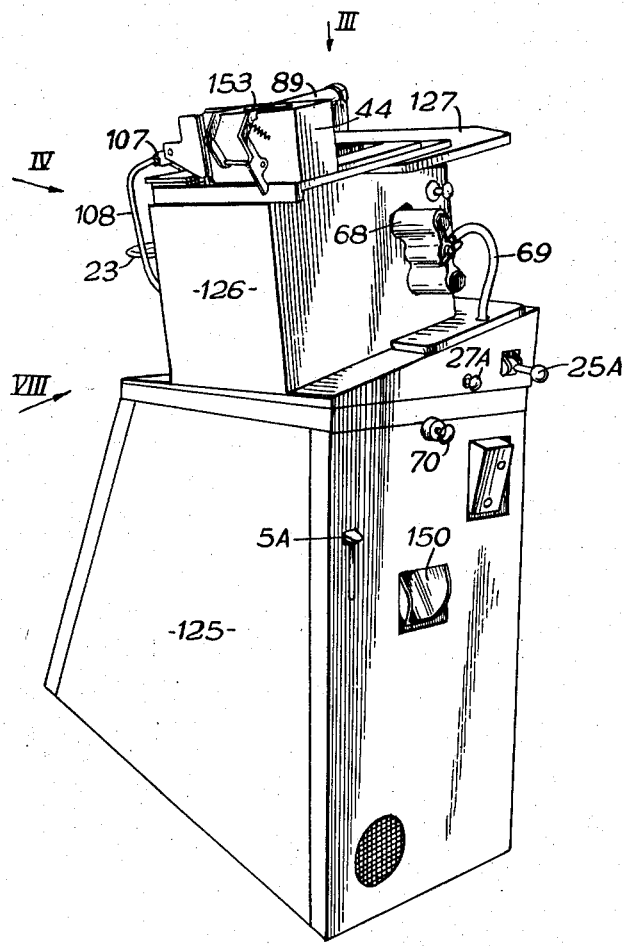
Figure 2 is a perspective view of the machine, showing the front and one side thereof.
Figure 3:
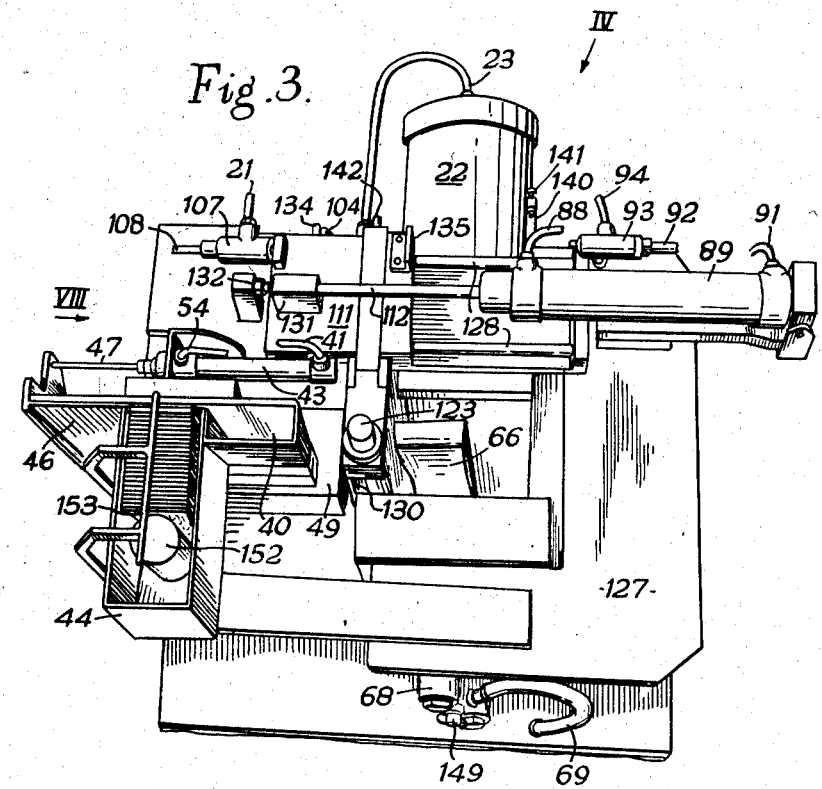
Figure 3 is a perspective plan view of the upper part of the machine, looking in the direction of arrow III, Figure 2.

In Figure 1 a number of pilot valves, piston-and-cylinder units and other parts are indicated which are not illustrated in detail because they are either of known construction or are sufficiently disclosed in diagrammatic form to be readily understood by persons acquainted with pneumatic, hydraulic and electric circuits.

Figures 2 to 9 of the drawings are mainly concerned with illustrating the relative dispositions of the parts of the machine.

Referring first to Figure 1 of the drawings, air at a suitable pressure (for example, about 80 lb. per sq. inch) is supplied through isolating cock 1, moisture separator 2, lubricator 3 and pressure regulator 4 to main air supply valve 5, the lubricator 3 being of a known type which is adjustable to inject drops of oil into the air stream to keep moving parts of air valves and cylinders lubricated.

Movement of the operating lever 5A of air supply valve 5 to the "on" position supplies air to shuttle valves 6 and 7, via lines 8 and 9, 10 respectively; energises a hydraulic accumulator 11, via lines 8, 9 and 12; operates an air cylinder 13 via lines 8, 9, 12, 14, and bleeds air through stop cock 18 via lines 8, 9, and 19 to feed other devices, as hereinafter described. Air cylinder 13 controls a micro-switch 15 connected to a relay starter 16 of a hydraulic pump and motor unit 17.

Air passes from shuttle valve 6 through line 20 to maintain piston 21 in main air cylinder 22 in the retracted position, as shown in Figure 1. Cylinder 22 is also connected to shuttle valve 6 by line 23 for effecting working strokes of piston 21.

Shuttle valve 6 is directly connected by line 24 to air control valve 25, which is in series connection by line 26 with a push-button start valve 27. By depressing button 27A of start valve 27, after setting the selector lever 25A of control valve 25 to the "start" position, air is exhausted from the left-hand side of shuttle valve 6, thereby allowing its shuttle to move to its alternative position (to the left in Figure 1). This movement admits air under pressure to the right-hand side of main air cylinder 22 to cause piston 21 to advance mould platen 28 on piston rod 29 toward a stationary mould platen 30. This movement of shuttle valve 6 to effect the working stroke of piston 21 also supplies air via lines 23, 31, 32 to an air cylinder 33 adapted to cause a water injector 34 to inject a predetermined quantity of water through pipe 35, having a non-return valve 35A, into an electrically heated flash boiler 37, distilled water being supplied from a tank 38 connected to injector 34 by pipe 39 having a non-return valve 39A.

Air is also supplied from shuttle valve 6 via lines 23, 31, 41 and stop cock 42 therein, to one end of an air cylinder 43 associated with a backer magazine 44, for moving a piston 45 in said cylinder 43 to cause a pusher 46 on piston rod 47 to displace a backer, from magazine 44 via feed chute 40, on to a platform 48, which at this point is accommodated in an electrically-heated activator chamber 49 connected to flash boiler 37 by steam pipe 36.

A branch line 50 connects to line 31 to supply air from shuttle valve 6, via a stop cock 51 to one end of air cylinder 52 associated with a timing unit, hereinafter more particularly described. The other end of cylinder 52 is connected by branch line 53 to line 54 extending between line 20 and the pusher cylinder 43, a stop cock 55 being included in line 54 between said cylinder 43 and the junction of line 54 with line 53.

Steam generated in the flash boiler 37 enters the activator chamber 49 through pipe 36 and condenses upon the backer thereby heating and softening the material of which the backer is composed.

The admission of air to cylinder 52 causes a piston 56 therein to impart corresponding movement to a piston 57 in oil dashpot 58, piston 57 having associated therewith a cam 59 adapted to engage plunger 60 of vacuum release valve 61 for opening to atmosphere the vacuum line 62 connected to vacuum pump 63, thereby reducing the load on said vacuum pump. This release coincides with the period during which the conditioned backer is being moulded, that is, when a vacuum effect is no longer required at suction tubes 64. The air cylinder 52, oil cylinder 58, cam 59, vacuum release valve 61 and associated parts constitute the timing unit above referred to.

The suction tubes 64 are provided for temporarily holding a backer 65, which they have picked up from platform 48, the backer 65 being thereby suspended on the tubes 64 while platform 48 is withdrawn from between male and female moulds 66, 67 mounted on platens 28, 30 respectively. The tubes 64 recede into cylinder block 68 which is connected by line 69 to a manually-operable release valve 70 and thence by line 71 to line 62 and vacuum pump 63. A bleed-line 72 connects line 71, and thus tubes 64 via line 69 and valve 70, to the cylinder 73 of a vacuum interlock device, hereinafter again referred to.

At the end of the stroke of pistons 56, 57 of the timing device—the speed of which controls the pressure-dwell period of moulds 66, 67 and is adjustable by a by-passing valve 74—a pilot valve 75, connected by line 76 to shuttle valve 6, and operable by cam 59, effects reversing of the shuttle of said shuttle valve 6. This action causes piston 21 in cylinder 22 to withdraw male mould 66 and also effects retraction of the timing unit cam 59 and of the pusher 46 and cuts out the water injector 34.

At the end of the withdrawal movement of male mould 66, a pivoted lever 77 is tripped to operate pilot valve 78, the lever 77 being operated by a stop 28A on platen 26 engaging a collar 79 carried on a rod 80 associated with an adjustable return spring and air buffer device 80A. Pilot valve 78 is connected by line 81 to shuttle valve 7, which on operation of pilot valve 78, throws the shuttle of valve 7 to a position which feeds air through line 82 to air cylinder 83 having a piston 84 operatively connected to a valve member 85 of an oil control valve 86. Oil then passes from accumulator 11 through conduit 87, valve 86 and conduit 88 to one end of oil cylinder 89 to cause piston 90 to move platform 48 from within activator chamber 49 to the loading position between the moulds 66, 67.

The other end of oil cylinder 89 is also connected to oil control valve 86 by conduit 91, to which valve 86 is also connected through conduit 88 and branch conduit 92, another pilot valve 93, indirectly operable by platform 48, and connected by conduit 94, through a non-return valve 95, to one end of oil cylinder 96. The other end of cylinder 96 is connected by conduit 97 to line 91 and thence to valve 86. Within cylinder 96 is a piston 98 having attached to its rod 99 a cam block 100 adapted, in a manner to be more particularly described, to effect presentation of a backer 65, carried by platform 48, to suction tubes 64.

At the end of its outward movement the cam block 100 trips pilot valve 101 which is connected to shuttle valve 7 by line 102 and thus causes reversal of the position of the shuttle of said valve 7 and through it relief of air cylinder 83, whose piston 84, under the action of return spring 103, resets oil control piston 85, thus allowing oil to move platform 48 back into activator chamber 49.

The final movement of platform 48 rocks a pivoted lever 104 and so trips pilot valve 105 which is connected by line 106 to line 19, at stop cock 18, and thence by lines 19, 9, 8 to shuttle valve 6, which is preset to recommence the moulding cycle above described. Valve 107 is operated at about the same time as valve 105, and as valve 107 is connected by conduit 108 to conduit 94 leading to oil cylinder 96, oil is exhausted from cylinder 96 so that its piston 98 reverses cam block 100. This completes one cycle initiated by manual setting of the control lever of air control valve 25 to the "start" position. To repeat the cycle with control valve 25 thus positioned necessitates depression again of start button 27.

When it is required to run the machine automatically the selector lever 25A of air control valve 25 is moved to the "auto" position which connects pilot valve 105 to shuttle 6 through line 106, control valve 25 and line 24, whereupon shuttle valve 6 operates in response to reciprocation of the platform transversing mechanism.

The vacuum interlock cylinder 73 houses a spring loaded plunger 109, with a projecting stem 110, and the arrangement is such that sealing of the suction tubes 64, when a backer 65 is in the tube-blocking position, withdraws the plunger 109 of the interlock cylinder 73 to allow a support 130, on which the platform 48 is mounted, to be moved by carrier 111 into the activator chamber 49 and thus cause the machine cycle to repeat until control valve 25 is set to the "off" position.

If a backer of incorrect proportions is offered to suction tubes 64 or if a backer is incorrectly positioned on the tubes 64, the incomplete sealing of the tubes permits the stem 110 of plunger 109 of the vacuum interlock device to project into a position (illustrated in Figure 5) in which it will engage with the platform carrier 111, which is connected to piston rod 112 of piston 90 in oil cylinder 89, and thus interrupts the operating cycle. If this occurs the operator closes main air supply valve 5 in order to open the machine and ascertain the cause of failure. The vacuum interlock plunger 109 is retracted by manual closure of vacuum valve 70, after which the platform carrier 111 may be manually moved into the activator chamber 49, the valve 70 released, the main valve 5 re-opened and the operating cycle recommenced.

The accumulator 11 is supplied with oil from a storage tank 113 through conduit 114, pump 115, conduit 116, filter 117 and conduit 118 to conduit 87. The pump 115 also connects with a circulating conduit 119, including a relief valve 120, to return pumped oil to tank 113 when not required for operation. Surplus or exhaust oil is returned to tank 113 from control valve 86 and pilot valve 107 by conduits 121, 121A respectively. Air exhausting from various air-operated or air-flow controlling devices is preferably passed through a common silencer; the air exhaust lines are indicated by suffixing the letter E to the reference numbers of the valves, such as 6E, 7E, 27E, 78E.

In Figures 2 to 9 of the drawings, many of the parts depicted in Figure 1 are not visible. The machine comprises a cabinet-like base 125 which houses and supports the hydraulic pump and motor unit 17, oil tank 113, oil filter 117, accumulator 11, vacuum pump 63, distilled water tank 38, flash boiler 37 and other parts. The moulds 66, 67 and the associated platens 28, 30 respectively and activator 49 are mainly accommodated in a hollow head 126 mounted on the base 125 and the magazine 45, pusher 46 and pusher cylinder 43 surmount the head 126. The top plate 127 of head 126 is gapped and the gap bridged by parallel guide rods 128 on which the platform carrier 111 is slidably supported. On the carrier 111 is mounted a cross slide 129 from which a platform support 130 is suspended by pillar 122, the platform 48 being a curved ledge (see Figure 1) on to which a backer, displaced from magazine 45 by pusher 46, drops via feed chute 40, when the platform support 130 is within the activator 49; the activator 49 is open at the top for the entrance of a backer falling from feed chute 40 and at one side for the insertion and withdrawal of the platform support 130, which latter when within said activator 49 practically closes the open top and side thereof to form a substantially closed chamber within which conditioning of the backer is effected.

The piston rod 112 of the oil cylinder 89 is connected by a coupling block 131 to the carrier 111, its outward stroke being limited by an adjustable stop 132. A stop block 133 on the carrier 111 is adapted when approaching the outer limit of stroke of piston rod 112 to operate pilot valve 107, and a projecting pin 134 on the carrier 111 is adapted, substantially simultaneously with operation of valve 107, to trip lever 104 which operates pilot valve 105. When the carrier 111 reaches the opposite end of its stroke a stop plate 135 thereon is adapted to operate pilot valve 93.

The oil cylinder 96 is arranged at right angles to the mould pressure cylinder 22 and the piston rod 99 associated therewith is fixedly connected to a curved arm 136 adapted to pass behind a fixed plate 137 and return through a guide slot 138 therein for attachment to cam block 100. This cam block 100 effects presentation of a backer 65, resting on platform 48, to suction tubes 64 by reason of said cam block contacting a roller 139 on one end of a pivoted lever 140, the other end of which, through an adjustable screw stop 141, is adapted at the appropriate time to swing forward and apply pressure to a pad 142 on cross slide 129, thereby effecting a lateral sliding of platform support 130 from its path of movement in which the platform 48 is carried into and out of the activator 49 (shown in full lines in Figure 6) into the position (shown in chain-dotted lines) in which the supported backer 65 is brought within the range of suction tubes 64. When the backer 65 has been sucked against the tubes 64 so as to be suspended thereby, the platform support 130 first moves back to take the platform 48 clear of the suspended backer 65, and then moves with carrier 111 clear of the opposed moulds 66, 67.

The mould 67 is one of a series of interchangeable moulds and has a base plate 146 by means of which it is secured to platform 30. The platen 28, carrying the female mould 66, is flexibly connected to a flange 143 on piston rod 29. A dome 144 on said flange 143 and a pressure pad 145 on platen 28 constitute a universal mounting which allows mould 66 to align with the mating mould 67. The female mould 66 preferably consists, as shown of a thick flat-surfaced rubber cushion which conforms to the shape of male mould 67 when pressed on thereby.

Figure 7:
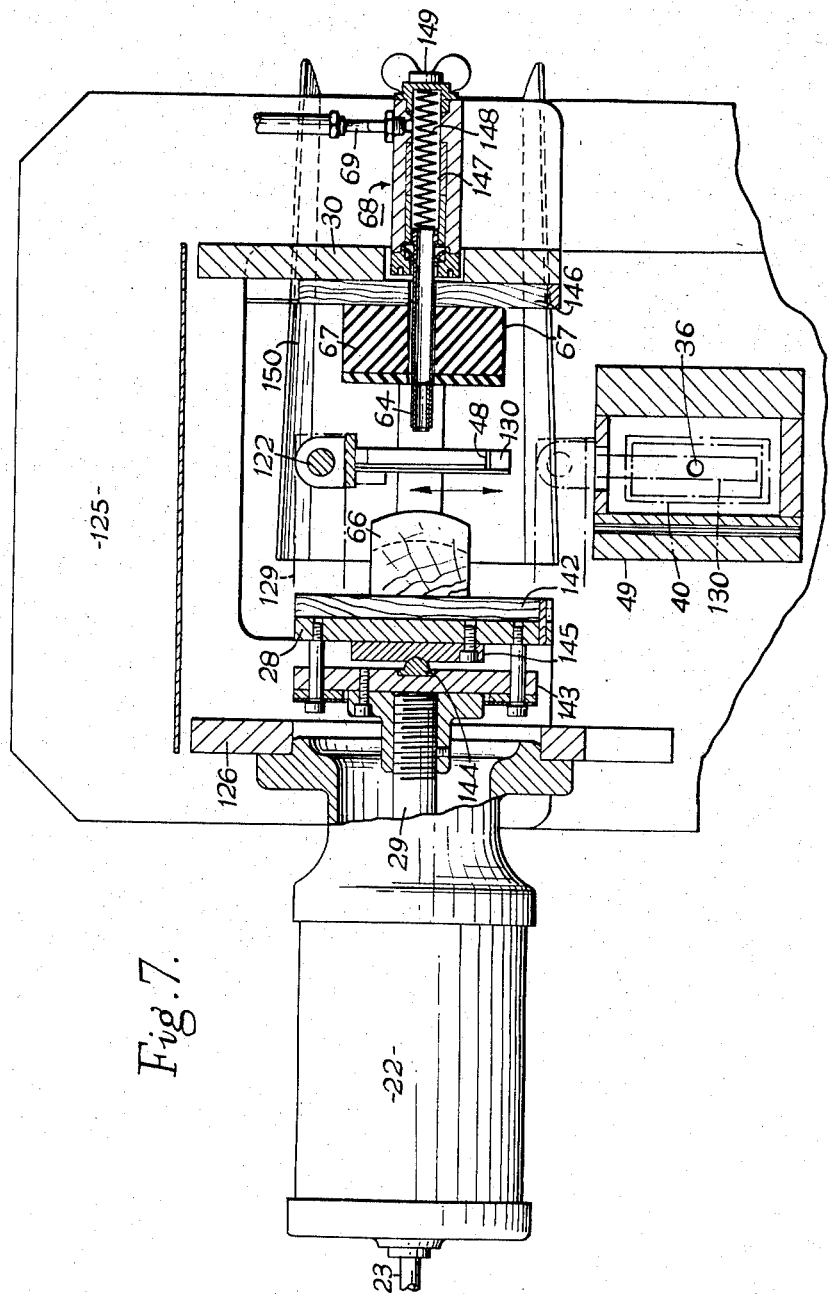
Figure 7 is a part-sectional plan on line VII—VII, Figure 6.

The suction tubes 64 are separately slidable in cylinders 147 in block 68 and are normally projected by springs 148 (see Figure 7). When pressure is applied by moving mould 66 to press the backer 65 into conformity with fixed mould 67 the tubes 64 are forced back into the cylinders 147 against the actions of springs 148. The tube-carrying block 68 is swivel mounted on spindle 149 parallel to the tube cylinders 147, so that the axes of the cylinders may be adjusted angularly to maintain the open ends of the suction tubes 64 opposite the approximate center of width of the backer and thus avoid leakage of air around the edge of the backer. The moulded backer 65 is forced by tubes 64 off the face of mould 67 as mould 66 recedes and as the suction effect at the tubes 64 is then cut off the molded backer 65 drops into a delivery chute 150 (Figures 2 and 7).

Figure 5:
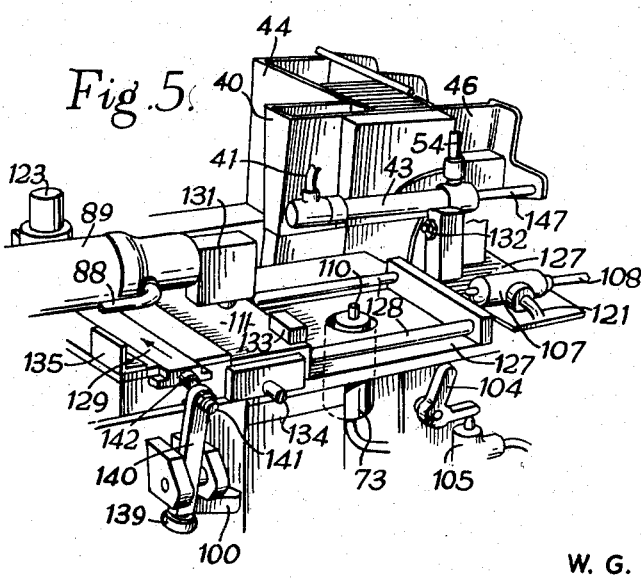
Figure 5 is a fragmentary view somewhat similar to Figure 4, but showing some parts of the machine moved to disclose other parts not clearly shown in Figure 4.

The operation of the vacuum interlock device has already been described. In Figure 5 the stem 110 of the plunger 109 (Figure 1) is shown in its relation to the carrier 111. The carrier 111 and parts associated therewith can be manually moved together by means of the cap nut 123 on the platform support pillar 122.

Although the sequence of relative movements of the carrier 111 and the cross slide 129 is controlled by the hydraulic and pneumatic circuits of the machine it may be desirable to incorporate means for locking the cross slide 129 to the carrier 111 in certain positions of the latter, to guard against the platform support 130 striking the moulds 66, 67 or the activating chamber 49. For this locking effect a floating ball detent is employed which includes a sunken seating 128A on one of the guide rods 128 opposite to the pivoted lever 140, that is, in alignment with the position of carrier 111 at which transverse movement of cross slide 129 is effected through lever 140. A ball 151 housed in a bore 111A in the carrier 111 (see Figure 9) is adapted to drop into the seating 128A, when the cross slide 129 is opposite lever 140, out of a recess 129A in the underside of cross slide 129. At all other positions of carrier 111 the ball 151 rides on the crest of the rod 128 and by engagement with recess 129A prevents transverse movement of the cross slide. That is, the cross slide 129 is free to move transversely in relation to carrier 111 only when opposite lever 140.

The backers 65 in magazine 44 are urged toward the discharge opening thereof over a sloping floor 44A by a weight element 152, a spring-loaded bar 153 being provided to hold the backers on the magazine floor.

Although the invention has been described in its particular application to the conditioning and moulding of shoe shank backers it is clearly not limited thereto, but has general application to conditioning fibrous and other blanks or workpieces immediately prior to moulding. Double-ply or multi-ply components may be conditioned and moulded by the machine described; the plies may be assembled and cemented together prior to being arranged in a single magazine or the various plies may be fed from several magazines into separate activator chambers or a common activator chamber and then subjected simultaneously to a common moulding operation. Duplicate suction tubes may be provided so that two plies or blanks can be pneumatically suspended between opposed moulds, another or other intermediate plies or blanks being temporarily supported by any suitable means until the moulding operation renders them unnecessary.

I claim:

1. A machine for manufacturing moulded components from thermoplastic impregnated fibrous blanks, comprising a base, a magazine for precut blanks awaiting use and mounted on said base, fluid operated means for ejecting separate blanks from said magazine, a substantially closed blank heating chamber on said base including means for heat-conditioning said ejected blank, substantially vertically opposed moulds mounted on said base for moulding said conditioned blank and comprising a fixed mould and a movable mould, fluid cylinder means mounted on said base and operatively connected to said movable mould, means normally extending through said fixed mould for temporarily suspending ejected blanks vertically between said moulds when open, said blank suspension means retreating for said mould closing operation, a carrier slidably mounted on said base, a blank-supporting platform slidably mounted on said carrier for movement relative thereto, fluid-operated means for moving said carrier first to dispose said platform within said blank heating chamber and then to convey the conditioned platform-suspended blank to between said moulds when open, and means for moving said platform relatively to said carrier to present said supported blank to said means for temporary blank suspension, said platform being then movable in reverse direction relatively to said carrier to leave said blank thus temporarily suspended and said carrier being finally movable to remove said platform, now empty, from between said moulds.

2. A machine as claimed in claim 1, having pneumatic means for temporarily suspending said blank between said moulds, said pneumatic means comprising at least one suction tube normally projecting from the moulding surface of one mould and adapted to recede as pressure is applied by the coacting moulds.

References Cited in the file of this patent
UNITED STATES PATENTS

| | | |
|---|---|---|
| 2,291,471 | Hopkins | July 28, 1942 |
| 2,396,988 | Cutler | Mar. 19, 1946 |
| 2,398,326 | Reeves | Apr. 9, 1946 |
| 2,487,233 | Gerke | Nov. 8, 1949 |
| 2,512,364 | Moxness | June 20, 1950 |